US012695036B2

(12) United States Patent
Martin et al.

(10) Patent No.: US 12,695,036 B2
(45) Date of Patent: Jul. 28, 2026

(54) MULTI-CONTACT MINIATURE CIRCUIT BREAKER WITH REDUCED ARCING

(71) Applicant: EATON INTELLIGENT POWER LIMITED, Dublin (IE)

(72) Inventors: Michael Thomas Martin, Mars, PA (US); Venkat raman Thenkarai Narayanan, Prague (CZ)

(73) Assignee: EATON INTELLIGENT POWER LIMITED, Dublin (IE)

( * ) Notice: Subject to any disclaimer, the term of this patent is extended or adjusted under 35 U.S.C. 154(b) by 291 days.

(21) Appl. No.: 18/539,623

(22) Filed: Dec. 14, 2023

(65) Prior Publication Data

US 2025/0201499 A1 Jun. 19, 2025

(51) Int. Cl.
*H01H 33/18* (2006.01)
*H01H 33/53* (2006.01)

(52) U.S. Cl.
CPC ............ *H01H 33/18* (2013.01); *H01H 33/53* (2013.01)

(58) Field of Classification Search
CPC ............. H01H 9/342; H01H 2009/305; H01H 2009/343; H01H 2009/348; H01H 33/18; H01H 33/53; H01H 33/56
USPC ........ 218/22, 15, 23, 34, 35, 38, 46, 51, 52, 218/106; 200/292, 293, 306
See application file for complete search history.

(56) References Cited

U.S. PATENT DOCUMENTS

| | | | | |
|---|---|---|---|---|
| 9,349,555 B2 * | 5/2016 | Yang | H01H 33/08 |
| 10,361,043 B2 * | 7/2019 | Okerman | H01H 71/46 |
| 11,581,159 B2 * | 2/2023 | Gibson | H01H 83/20 |
| 2017/0110281 A1 * | 4/2017 | Lathrop | H01H 71/0228 |
| 2022/0230829 A1 * | 7/2022 | Ostrovsky | H01H 71/524 |
| 2022/0344120 A1 * | 10/2022 | Long | H01H 71/54 |
| 2023/0207239 A1 * | 6/2023 | Maloney | H01H 73/18 218/15 |

* cited by examiner

*Primary Examiner* — William A Bolton
(74) *Attorney, Agent, or Firm* — Eckert Seamans Cherin & Mellott, LLC

(57) ABSTRACT

A circuit breaker includes two sets of separable contacts in series per pole, primary contacts and secondary contacts, reducing overall let-through energy and peak pressures within the arcing chambers of the breaker during arc interruption. Opening both sets of contacts produces two arcs in series per pole, and the two series arcs increase the line to load resistance of the breaker relative to when only one set of contacts are opened. The increased line to load resistance causes the peak let-through current, Ipk, to decrease relative to what Ipk would be if only one set of contacts were to be opened. The circuit breaker also includes an internal primary vent that vents gases away from the primary contacts to another area within the circuit breaker housing, and a secondary exhaust vent that vents gases away from the secondary contacts to the exterior of the circuit breaker.

12 Claims, 7 Drawing Sheets

200

| | Configuration | | | Pressure Location | Ipk (kA) | Arc Volt (V) | Pressure Peak | | Pressure Reduction from Baseline |
|---|---|---|---|---|---|---|---|---|---|
| | Configuration | Secondary Vent | Internal Vent | | | | bar | psi | |
| Row A | Baseline | No | No | Front | 7.3 | 120 | 1.5 | 21.8 | - - |
| Row B | | No | No | Back | 7.3 | 120 | 1.02 | 14.8 | - - |
| Row C | Baseline + Secondary Vent | Yes | No | Front | 5.78 | 105 | 0.65 | 9.4 | 57% |
| Row D | | Yes | No | Back | 5.78 | 105 | 0.45 | 6.5 | 56% |
| Row E | Baseline + Secondary & Internal Vents | Yes | Yes | Front | 5.78 | 105 | 0.4 | 5.8 | 73% |
| Row F | | Yes | Yes | Back | 5.78 | 105 | 0.35 | 5.1 | 66% |

FIG. 6

MULTI-CONTACT MINIATURE CIRCUIT BREAKER WITH REDUCED ARCING

FIELD OF THE INVENTION

The disclosed concept relates generally to circuit breakers, and in particular, to devices and systems for mitigating the effects of arcing within circuit breakers.

BACKGROUND OF THE INVENTION

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit interrupters typically include mechanically operated separable electrical contacts, which operate as a switch. When the separable contacts are in contact with one another in a closed state, current is able to flow through any circuits connected to the circuit interrupter. When the separable contacts are separated from one another in an open state, current is prevented from flowing through any circuits connected to the circuit interrupter. The separable contacts may be operated either manually by way of an operator handle, remotely by way of an electrical signal, or automatically in response to a detected fault condition. Typically, such circuit interrupters include an actuator designed to rapidly close or open the separable contacts, and a trip mechanism, such as a trip unit, which senses a number of fault conditions to trip the separable contacts open automatically using the actuator. Upon sensing a fault condition, the trip unit trips the actuator to move the separable contacts to their open position.

Typically, when a circuit interrupter opens its separable contacts during a fault condition, an arc is generated across the contacts. The circuit interrupter is only considered fully open when the arc is completely extinguished. Arcing produces significant heat, which in turn can significantly increase the pressure within the circuit interrupter, and this heat and pressure can cause irreversible damage if the arc is not extinguished as quickly as possible. In miniature circuit breakers in particular, the arc that is generated under high fault currents can create high pressures and let-through energy that can lead to destruction or degradation of the circuit breaker case and current-carrying components, making it difficult to fulfill an ongoing desire to produce circuit breaker cases from more sustainable thermoplastics.

There is thus room for improvement in arc mitigation devices and systems in circuit breakers, including miniature circuit breakers.

SUMMARY OF THE INVENTION

These needs, and others, are met by embodiments of an improved circuit breaker that includes two sets of separable contacts in series, a set of primary contacts and a set of secondary contacts. Including both sets of separable contacts in series reduces overall let-through energy and peak pressure within the arcing chambers of the circuit breaker during an arc interruption event, relative to what the let-through energy and peak pressure would be if only one set of contacts were to be opened. Furthermore, in addition to a standard primary external vent that exhausts gas generated by separation of the primary contacts to the exterior of the circuit breaker, the disclosed improved breaker also includes a new internal primary vent that exhausts gas generated by the primary contacts to other interior areas of the circuit breaker and a new secondary external vent that exhausts gas generated by separation of the secondary contacts to the exterior of the circuit breaker. The inclusion of the internal primary vent and the secondary external vent further reduces peak pressure within the circuit breaker significantly, relative to what the pressure would be if only the primary external vent were included.

In one exemplary embodiment of the disclosed concept, a circuit breaker comprises: a housing; a line side structured to electrically connect to a power source; a load side structured to electrically connect to a load; a first set of separable contacts, the first set of separable contacts being primary contacts electrically connected between the line side and the load side; a second set of separable contacts, the second set of separable contacts being secondary contacts electrically connected between the line side and the load side; an operating mechanism structured to open and close the primary contacts; a thermal magnetic arrangement configured to open the primary contacts from a closed state once current reaches a predetermined severity threshold; a secondary actuator structured to open the secondary contacts from a closed state; a printed circuit board (PCB); an internal primary vent; and a secondary exhaust vent. The primary contacts and the secondary contacts are in series. The internal primary vent is structured to vent gas away from the vicinity of the primary contacts and into an area internal to the housing. The secondary exhaust vent is structured to vent gas away from the secondary contacts to an exterior of the housing. The PCB is structured to monitor electrical conditions in the circuit breaker and to actuate the secondary actuator. The PCB is configured such that, when the primary contacts are closed and the secondary contacts are closed, the PCB actuates the secondary actuator to open the secondary contacts simultaneously during thermal-magnetic opening of the primary contacts in response to detecting a fault condition exceeding a predetermined severity threshold.

BRIEF DESCRIPTION OF THE DRAWINGS

A full understanding of the invention can be gained from the following description of the preferred embodiments when read in conjunction with the accompanying drawings in which:

FIG. 6 is a table comparing peak current and pressure data for fault event simulations for a first condition where the circuit breaker only includes a primary exhaust vent, for a second condition where the circuit breaker includes a secondary exhaust vent and a primary exhaust vent, and for a third condition where the circuit breaker includes an internal primary vent, a secondary exhaust vent, and a primary exhaust vent;

DETAILED DESCRIPTION OF THE INVENTION

Figure 1A:
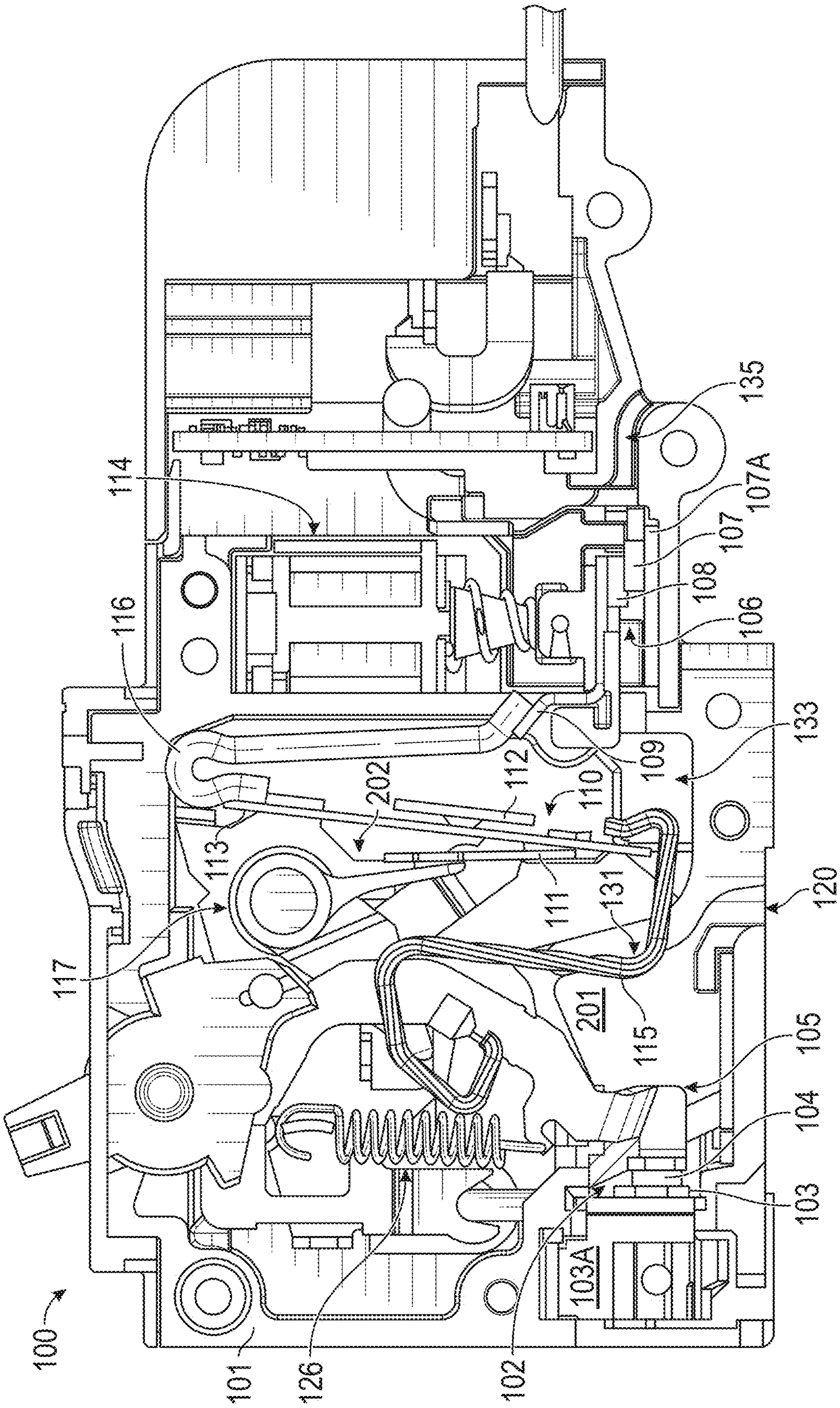
FIG. 1A is a sectional view of one pole of an improved circuit breaker that includes two sets of separable contacts in series, along with an internal primary vent, a secondary external vent, and a primary external vent, in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As employed herein, when ordinal terms such as "first" and "second" are used to modify a noun, such use is simply intended to distinguish one item from another, and is not intended to require a sequential order unless specifically stated.

As employed herein, the term "number" shall mean one or an integer greater than one (i.e., a plurality).

Figure 1B:
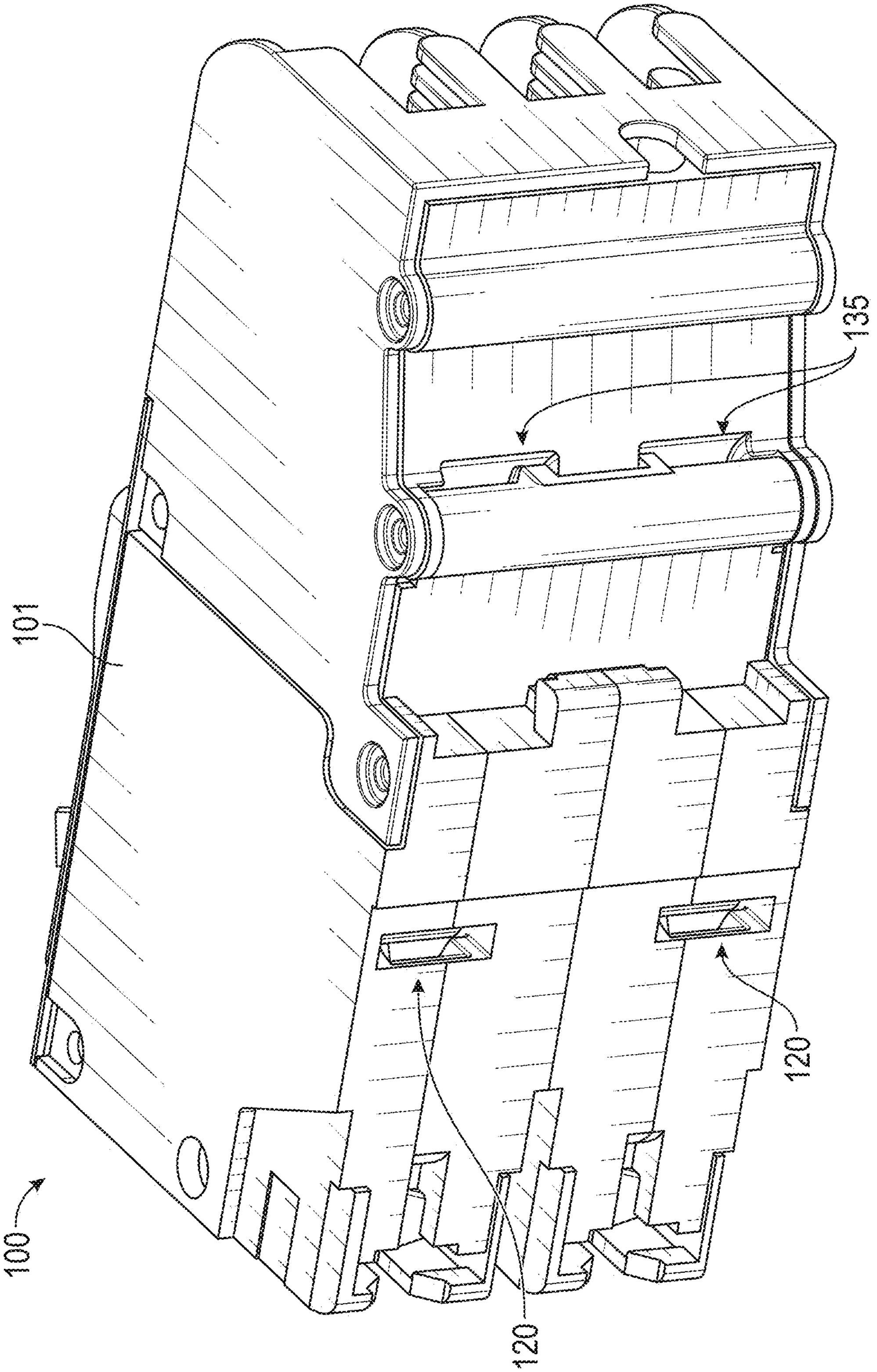
FIG. 1B is a partial isometric view of the exterior of the improved circuit breaker shown in FIG. 1A, providing an external view of the two exhaust vents included in each of the two poles of the circuit breaker.
Figure 2:
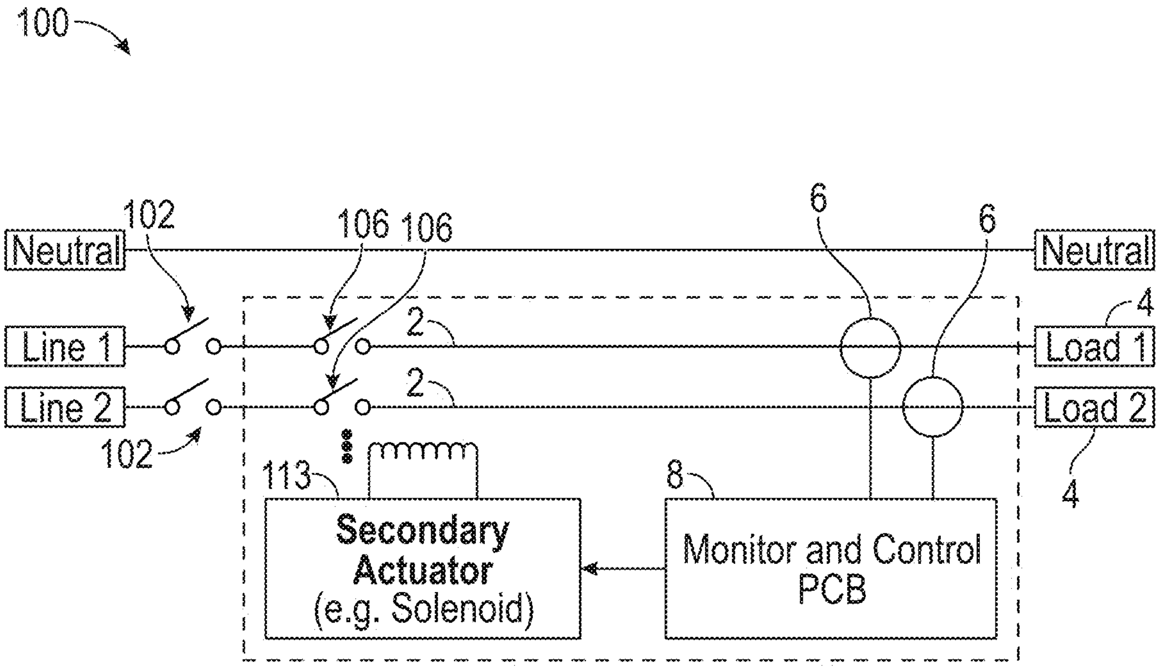
FIG. 2 is a schematic block diagram depicting the two poles of the circuit breaker shown in FIGS. 1A-1B and how the two sets of separable contacts in series per pole are connected between a line side and a load side of the circuit breaker, in accordance with an example embodiment of the disclosed concept.

Described herein are embodiments of an improved circuit breaker 100 that includes two sets of separable in series per pole in order to reduce overall let-through energy during an arc interruption event and thus reduces peak pressures within the arcing chambers of the circuit breaker. FIG. 1A is a sectional view of a single pole of the improved circuit breaker 100 and FIG. 1B is a partial isometric view of the exterior of the 2-pole improved circuit breaker 100, in accordance with an example embodiment of the disclosed concept. FIG. 2 provides a schematic representation of the 2 poles of the circuit interrupter 100. The circuit breaker 100 can comprise, for example and without limitation, a miniature circuit breaker. Each pole of the circuit breaker comprises identical components, and it will be appreciated that the sectional view shown in FIG. 1A can depict either of the two poles shown in FIG. 1B. While the circuit breaker 100 is depicted as a 2-pole circuit breaker in the figures, particularly FIG. 1B and FIG. 2, it should be noted that the 2-pole embodiment is an illustrative example, as the advantageous features of the circuit breaker 100 are implemented within each pole of the circuit breaker 100. That is, the features of the improved circuit breaker 100 can be implemented within a circuit breaker having only a single pole or having more than 2 poles without departing from the scope of the disclosed concept.

The circuit breaker 100 includes a housing 101, which can comprise, for example and without limitation, a thermoplastic case which houses the electromechanical components of the circuit breaker 100. The circuit breaker 100 further comprises two sets of separable contacts per pole positioned in series. The first set of separable contacts are the primary contacts 102, which includes a primary stationary contact 103 and a primary movable contact 104. The primary stationary contact 103 is disposed at one end of a primary stationary conductor 103A. The primary movable contact 104 is disposed at one end of a first movable conductor 105. The first movable conductor 105 is formed as an arm and is thus also referred to herein as the primary movable arm 105. The second set of separable contacts are the secondary contacts 106, which includes a secondary stationary contact 107 and a secondary movable contact 108. The secondary stationary contact 107 is disposed at one end of a secondary stationary conductor 107A. The secondary movable contact 108 is disposed at one end of a second movable conductor 109. The second movable conductor 109 is formed as an arm and is thus also referred to herein as the secondary movable arm 109. The primary and secondary stationary contacts 103, 107 remain stationary relative to the housing 101, while the primary and secondary movable contacts 104, 108 are structured to move between closed and open positions. Existing circuit breakers typically include only one set of separable contacts, with said one set of separable contacts being comparable to the primary contacts 102 of the circuit breaker 100, and it should be noted that the inclusion of the secondary contacts 106 in addition to the primary contacts 102 represents an improvement over existing circuit breakers for reasons that will become apparent later herein.

In FIG. 1A, the primary contacts 102 are depicted as being closed (i.e. in a closed state), wherein the primary movable contact 104 is in a closed position such that it is in physical contact with the primary stationary contact 103. The secondary contacts 106 are also depicted as being closed (i.e. in a closed state), wherein the secondary movable contact 108 is in a closed position such that it is in physical contact with the secondary stationary contact 107. As detailed further later herein, the primary movable contact 104 can be moved from the closed position shown in FIG. 1A to an open position (in which it is separated from the primary stationary contact 103 by a gap) by a thermal magnetic arrangement 110 comprising an armature 111 and a plate 112 attached to a bimetal strip 113. Similarly, the secondary movable contact 108 can be moved from the closed position shown in FIG. 1 to an open position (in which it is separated from the secondary stationary contact 107 by a gap) by a secondary actuator 114. In FIG. 1, the secondary actuator 114 is a solenoid. As such, the secondary actuator 114 is referred to hereinafter as the "solenoid 114", but any device suitable for use in actuating the secondary contacts 106 between the open and closed states and can be used as a secondary actuator 114 in the circuit breaker 100 without departing from the scope of the disclosed concept.

FIG. 2 provides a simplified depiction of how the primary and secondary contacts 102, 106 are positioned between the line side and the load side of the circuit breaker 100. Each pole of the circuit breaker 100 includes a line conductor 2 structured to electrically connect a power source (not shown) to a load 4. The circuit breaker 100 is structured to trip open in order to interrupt current flowing between the power source and load 4 in each pole in the event of a fault condition (e.g., without limitation, an overcurrent condition) in order to protect the load 4 and circuitry associated with the load 4, as well as the power source. The circuit breaker 100 further includes a current sensor 6 and a monitor and control PCB 8, referred to hereinafter as the "PCB 8" for brevity. As detailed further herein, the PCB 8 monitors conditions in the circuit breaker 100 and initiates tripping of the secondary contacts 106.

The opening of the primary contacts 102 during an overcurrent fault will now be detailed. Under normal operating conditions, the primary and secondary contacts 102, 106 are closed, enabling current to flow from the power source to the primary stationary conductor 103A to the primary contacts 102 to the primary movable arm 105 to a first flexible conductor 115 to the bimetal strip 113 to a second flexible conductor 116 to the secondary movable arm 109 to the secondary contacts 106 to the secondary stationary conductor 107A to the load 4. It will be appreciated that each line conductor 2 depicted in FIG. 2 comprises all of the components shown in FIG. 1A and listed above that enable power to flow from the power source to each load 4 in a given pole (i.e. the primary stationary conductor 103A, primary movable arm 105, the first flexible conductor 115, the bimetal strip 113, the second flexible conductor 116, the secondary movable arm 109, and the secondary stationary conductor 107A).

Under an overcurrent fault condition, the high magnitude of the fault-level current flowing through the circuit breaker 100 generates a large enough magnetic field within the armature 111 to enable the magnetic attraction between the armature 111 and the plate 112 to move the armature 111 toward the plate 112 and actuate movement of the movable arm 105 via an operating mechanism 117, thus tripping open the primary contacts 102 by separating the primary movable contact 104 from the primary stationary contact 103.

From the description provided above, it should be noted that the opening of the primary contacts 102 during an overcurrent condition is actuated by the thermal-magnetic and electromechanical components (e.g. the bimetal strip 113, the armature 111, the metal plate 112, the operating mechanism 117) of the circuit breaker 100. In contrast, opening of the secondary contacts 106 is initiated by the PCB 8. The PCB 8 is configured to monitor power flowing through the circuit breaker 100 via the current sensor 6 and/or other sensors and to detect fault conditions based on the power flowing through the circuit breaker 100. More specifically, the PCB 8 is configured to initiate tripping of the secondary contacts 106 based on the same conditions that cause the thermal-magnetic and electromechanical components to trip open the primary contacts 102. In response to detecting a fault condition, the PCB 8 is configured to trip open the secondary contacts 106 simultaneously with the thermal-magnetic opening of the primary contacts 102 initiated through the armature 111, plate 112, and bimetal strip 113. The PCB 8 is configured to determine a severity level of a fault condition based on a number of predetermined severity thresholds.

Opening both the primary and secondary contacts 102, 106 stops the flow of current from the power source 3 to the load 4 and minimizes let-through current and the effects of arcing, as detailed further later herein. It will be appreciated that only opening the primary contacts 102 while keeping the secondary contacts 106 closed also stops the flow of current from the power source 3 to the load 4, but does not minimize let-through current. In addition, only opening the primary contacts 102 while keeping the secondary contacts 106 closed can potentially lead to tack welding of the secondary contacts 106 due to the effects of arcing in high severity fault conditions.

When the circuit breaker 100 is connected between the power source and the load 4 and operating to supply power to the load 4, a voltage exists across the interface between the primary movable contact 104 and the primary stationary contact 103 (referred to hereinafter as the "primary interface voltage"), and another voltage exists between the secondary movable contact 108 and the secondary stationary contact 107 (referred to hereinafter as the "secondary interface voltage"). It will be appreciated that the primary interface voltage is negligible when the primary contacts 102 are closed and that the secondary interface voltage is negligible when the secondary contacts 106 are closed.

When the primary contacts 102 are opened under a fault condition, the primary interface voltage causes arcing across the gap created by the primary movable contact 104 moving away from the primary stationary contact 103. Similarly, when the secondary contacts 106 are opened under a fault condition, the secondary interface voltage causes arcing across the gap created by the secondary movable contact 108 moving away from the secondary stationary contact 107. Let-through current is the current that continues to be let through the circuit breaker 100 from the power source to the load 4 as a result of arcing while either set of separable contacts 102, 106 is opening. In addition to producing let-through current, arcing also generates significant heat, which causes a significant pressure increase within the interior of the housing 101.

If only the primary contacts 102 were opened under a high severity fault condition (i.e. while the secondary contacts 106 were kept closed) such that there was only arcing across the interface of the primary contacts 102, this would reproduce the conditions that exist in known circuit breakers that only include one set of separable contacts between a power source and a load. In the improved circuit breaker 100, opening both the primary contacts 102 and the secondary contacts 106 under a high severity fault condition produces two arcs in series per pole, and the two arcs in series increase the line to load resistance per pole of the circuit breaker 100 relative to what the line to load resistance is when only the primary contacts 102 are opened. Under high severity fault conditions, the increased line to load resistance of the circuit breaker 100 that results from opening both the primary and secondary contacts 102, 106 causes the peak let-through current, Ipk, to decrease relative to what Ipk would be if only the primary contacts 102 were to be opened while the secondary contacts 106 were to remain closed.

Reducing the peak let-through current Ipk also reduces the pressure within the circuit breaker 100 caused by gases produced during arcing. The circuit breaker 100 also advantageously includes additional vents that are not found in known circuit breakers in order to further reduce the pressure caused by gases produced during arcing. Referring to FIG. 1A, it is noted that the circuit breaker 100 includes a primary exhaust vent 120 that vents gases produced by the primary contacts 102 to the exterior of the circuit breaker housing 101. The primary exhaust vent 120 is a feature that can be found in known circuit breakers. However, unlike known circuit breakers, the circuit breaker 100 additionally includes an internal primary vent 131 that vents gases generated by the primary contacts 102 away from the vicinity of the primary contacts 102 and into another area within the interior of the housing 101. For example and without limitation, the internal primary vent 131 can vent gases into a main primary mechanism area 133 within the interior of the housing 101. The main primary mechanism area 133 is an area that includes, for example and without limitation, the armature 111, the metal plate 112, the bimetal strip 113, and the operating mechanism 117.

Figure 3A:
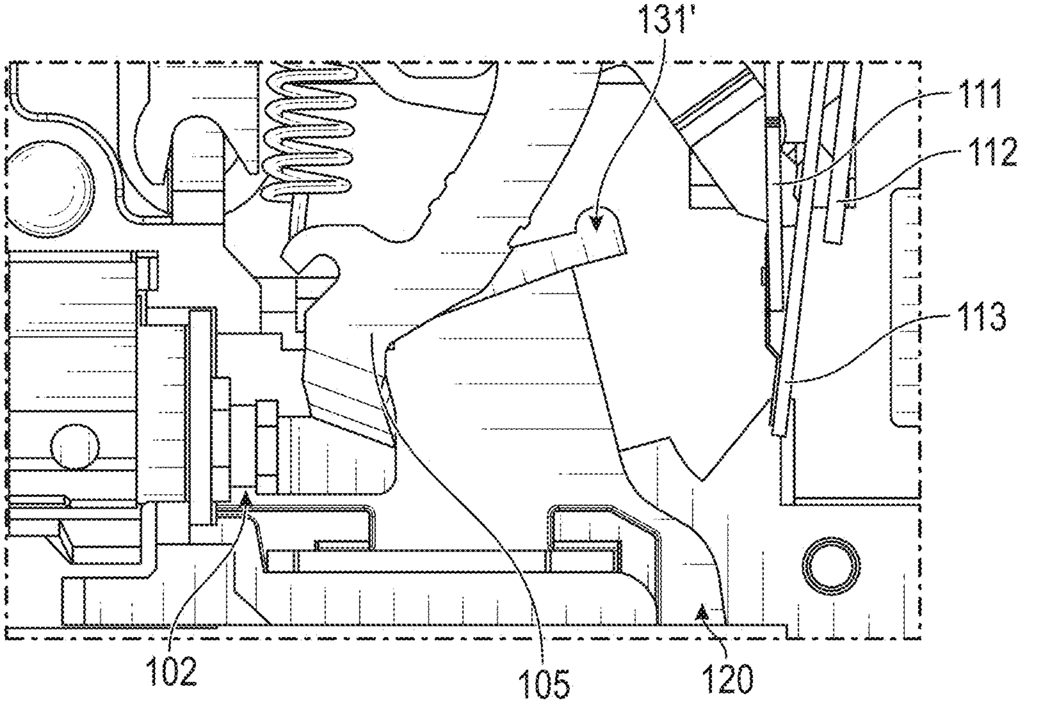
FIG. 3A is an enlargement of a portion of the circuit breaker shown in FIG. 1A, shown in a sectional view taken along a cutting plane parallel to the cutting plane of the sectional view shown in FIG. 1A, showing a first embodiment of an internal vent for exhausting gases generated by the primary separable contacts, in accordance with an example embodiment of the disclosed concept.
Figure 3B:
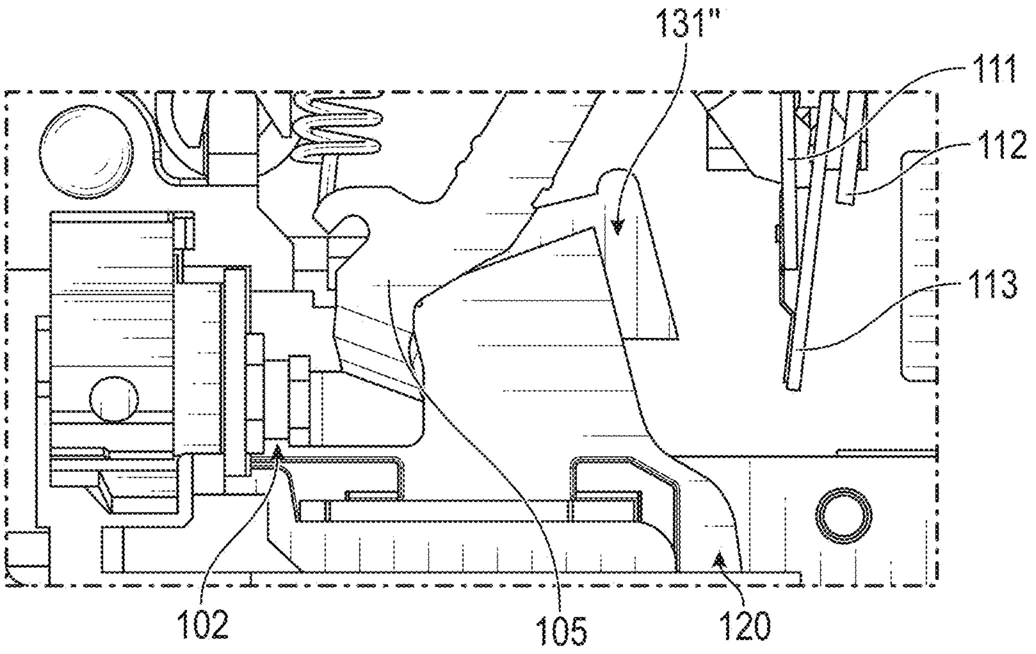
FIG. 3B is an enlargement of a portion of the circuit breaker shown in FIG. 1A, shown in a sectional view taken along a cutting plane parallel to the cutting plane of the sectional view shown in FIG. 1A, showing a second embodiment of an internal vent for exhausting gases generated by the primary separable contacts, in accordance with an example embodiment of the disclosed concept.

Enabling gases produced during opening of the primary contacts 102 to vent into the main primary mechanism area 133 in addition to venting to the exterior of the housing 101 through the primary exhaust vent 120 enables the gases to disperse from the immediate vicinity of the primary contacts 102 more quickly due to the additional flow area available to the gases. This offers additional reduction in pressure within the circuit breaker 100 that is not found in known circuit breakers that only include an external exhaust vent such as the primary exhaust vent 120. The internal primary vent 131 can vary in depth and cross-section without departing from the scope of the disclosed concept, and two non-limiting illustrative example embodiments of the shape that the internal primary vent 131 can take are shown in FIG. 3A and FIG. 3B, numbered respectively with the reference numbers 131' and 131". It will be appreciated that the geometry of the internal vent 131 can be adjusted depending on how exhaust gas needs to be routed.

Figure 4:
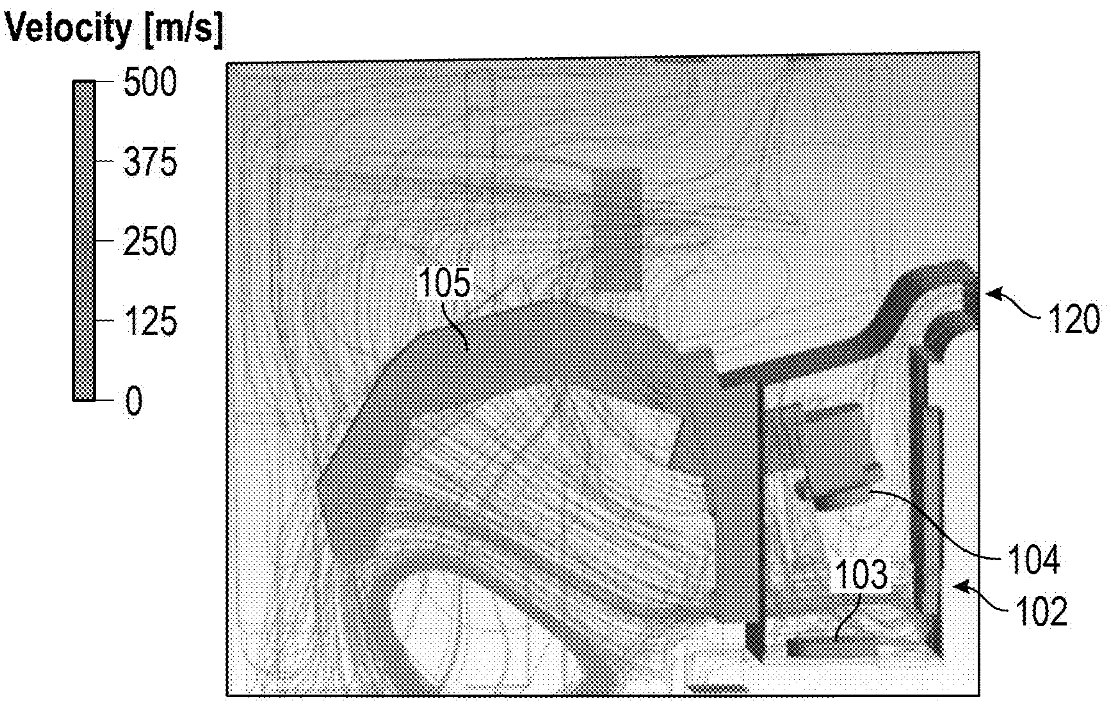
FIG. 4 is a flow line diagram of gases produced during a simulation of a separation of the primary contacts of the circuit breaker shown in FIGS. 1A and 1B, when the circuit breaker only includes a primary exhaust vent.
Figure 5:
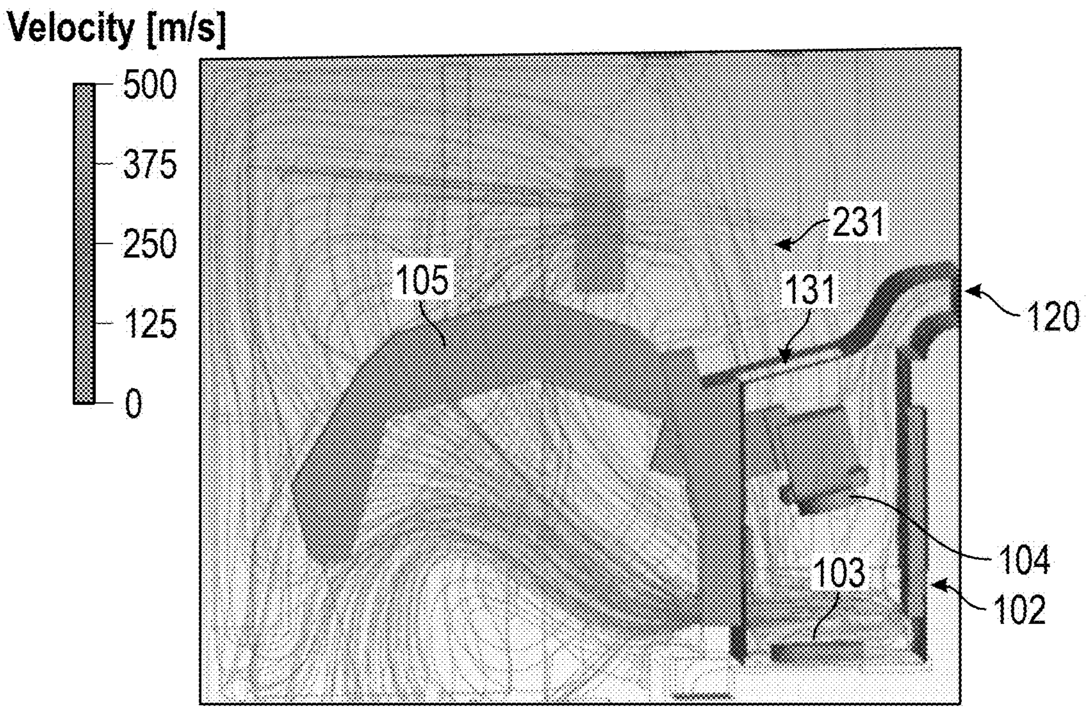
FIG. 5 is a flow line diagram of gases produced during a simulation of a separation of the primary contacts of the circuit breaker shown in FIGS. 1A and 1B, when the circuit breaker includes both an internal primary vent and a primary exhaust vent.

FIG. 4 depicts the flow of gas produced during arcing that results from the primary contacts 102 opening during a fault condition when the circuit interrupter 100 does not include the internal primary vent 131, such that the gas can only flow through the primary exhaust vent 120. It is noted that data for the setup depicted in FIG. 4 is shown in Rows A and B of Table 200 shown in FIG. 6, described in more detail later herein. FIG. 5 depicts the flow of gas the results from arcing when the primary contacts 102 open and the gas can flow through both the primary exhaust vent 120 and the internal primary vent 131. Data for the setup depicted in FIG. 5 is shown in Rows E and F of Table 200 shown in FIG. 6. In FIG. 5. the reference number 231 indicates gas flow that is generated by separation of the primary contacts 102 and gets exhausted through the intemal primary vent 131 into the main primary mechanism area 133. In comparing FIG. 5 to FIG. 4, it can be seen that the internal primary vent 131 in FIG. 5 enables significant gas flow 231 through the intemal primary vent 131 in the upward direction (relative to the view shown in FIG. 5) in addition to the gas flow through the primary exhaust vent 120. That is, including the internal primary vent 131 in the circuit breaker 100 results in a decreased mass flow rate and decreased velocity of gases moving from the vicinity of the separable contacts 102 toward the primary movable arm 105. It will thus be appreciated that, during an arcing event, pressure within the circuit breaker 100 is significantly decreased by the internal vent 131 providing access to additional flow area for the gases, thereby increasing the flow of gas away from the primary contacts 102 and away from the primary movable arm 105. The decreased flow of hot gases toward the primary movable arm 105 also reduces the risk that the gases will cause annealing of the mechanical spring 126 (shown in FIG. 1A, not shown in FIGS. 4-5).

The circuit breaker 100 further includes a secondary exhaust vent 135 that vents gases produced by the secondary contacts 106 to the exterior of the circuit breaker housing 101. It will be appreciated that the secondary exhaust vent 135 is another feature that is not found in known circuit breakers, given that the secondary contacts 106 in series with the primary contacts 102 is a feature that is not found in known circuit breakers.

FIG. 6 is a comparison table 200 providing data demonstrating that adding the secondary contacts 106 in series with the primary contacts 102 in each pole of the circuit breaker 100 significantly reduces peak current, Ipk, and further demonstrating that adding a secondary vent and an internal vent significantly reduces the increase in the peak pressure in the interior of the circuit breaker 100 due to heat/energy released by arcing during opening of the primary contacts 102 and secondary contacts 106, as compared to a circuit breaker that does not have a secondary vent or an internal vent. Table 200 includes data that was recorded while simulating the same high-severity fault conditions (a short circuit event) and implementing three different venting configurations of the circuit breaker 100, under a 10 kA short circuit current rating. In addition, the data recorded in table 200 reflects two different configurations of separable contacts per pole, as detailed further below. The notation of "Front" or "Back" in the Location column of table 200 corresponds to a respective front location 201 and back location 202 as numbered in FIG. 1A, and indicates that simulation pressures were monitored at either the front location 201 or the back location 202. These front 201 and back 202 locations were chosen based on their proximities to the arcing zone between the primary contacts, with the front 201 being closer to the arc and the back 202 being relatively farther from the arc. It is noted that the back 202 location only sees the arc directly due to the inclusion of the primary internal vent 131 in the circuit breaker 100.

Continuing to refer to FIG. 6, Row A and Row B in table 200 contain data for measurements taken during a short circuit event where the circuit breaker 100 only included the primary contacts 102 in each pole (i.e. did not include the secondary contacts 106) and only included the primary exhaust vent 120 (i.e. without including the internal primary vent 131 or the secondary exhaust vent 135), with said configuration being labeled as "Baseline" in the table 200. The Baseline configuration is labeled as such since known circuit breakers only include one set of separable contacts per pole and only include a primary exhaust vent.

Row C and Row D in table 200 contain data for measurements simulated for a short circuit event where the circuit breaker 100 included secondary contacts 106 in series with the primary contacts 102 and included the secondary exhaust vent 135 in addition to the primary exhaust vent 120 (i.e. without including the internal primary vent 131), with said configuration being labeled as "Baseline+Secondary Vent" in the table 200. In comparing the data from Rows C and D to the data from Rows A and B, it can be seen that including the secondary contacts 106 in series with the primary contacts 102 in the observed pole of the circuit breaker 100 reduces peak current, Ipk, and that including the secondary exhaust vent 135 in addition to the primary exhaust vent 120 reduces the pressure increase within the circuit breaker 100 that results from opening both sets of separable contacts 102, 106. For example, for both the front location 201 and the back location 202, the peak current Ipk under the Baseline condition is over 7 kA (7.3 kA), and the peak current Ipk under the Baseline+Secondary Vent condition is less than 6 kA (5.78 kA). In addition, at the front location 201, there is a reduction in peak pressure of over 50% (value of 57% in last column of Row C), and at the back location 202, there is also a reduction in peak pressure of over 50% (value of 56% in last column in Row D).

Row E and Row F in table 200 contain data for measurements simulated for a short circuit event where the circuit breaker 100 included secondary contacts 106 in series with the primary contacts 102 and included all of the vents shown in FIG. 1A, i.e. the internal primary vent 131, the secondary exhaust vent 135, and the primary exhaust vent 120, with said configuration being labeled as "Baseline+Secondary & Internal Vents" in the table 200. In comparing the data from Rows E and F to the data from Rows C and D, Rows E and F show that even with the peak let through current Ipk being the same under the Baseline+Secondary Vent condition and under the Baseline+Secondary & Internal Vents condition, adding the internal primary vent 131 further reduces pressure within the circuit breaker 100. For example, for both the front location 201 and the back location 202, the peak current Ipk is 5.78 kA under both the Baseline+Secondary Vent condition and under the Baseline+Secondary & Internal Vents condition. However, for the front location 201, the pressure reduction for the Baseline+Secondary & Internal Vents condition is 16% greater than the Baseline+Secondary Vent condition (i.e. Row E value of 73% minus Row C value of 57%), and for the back location 202, the pressure reduction for the Baseline+Secondary & Internal Vents condition is 10% greater than the Baseline+Secondary Vent condition (i.e. Row F value of 66% minus Row D value of 56%).

Figure 7:
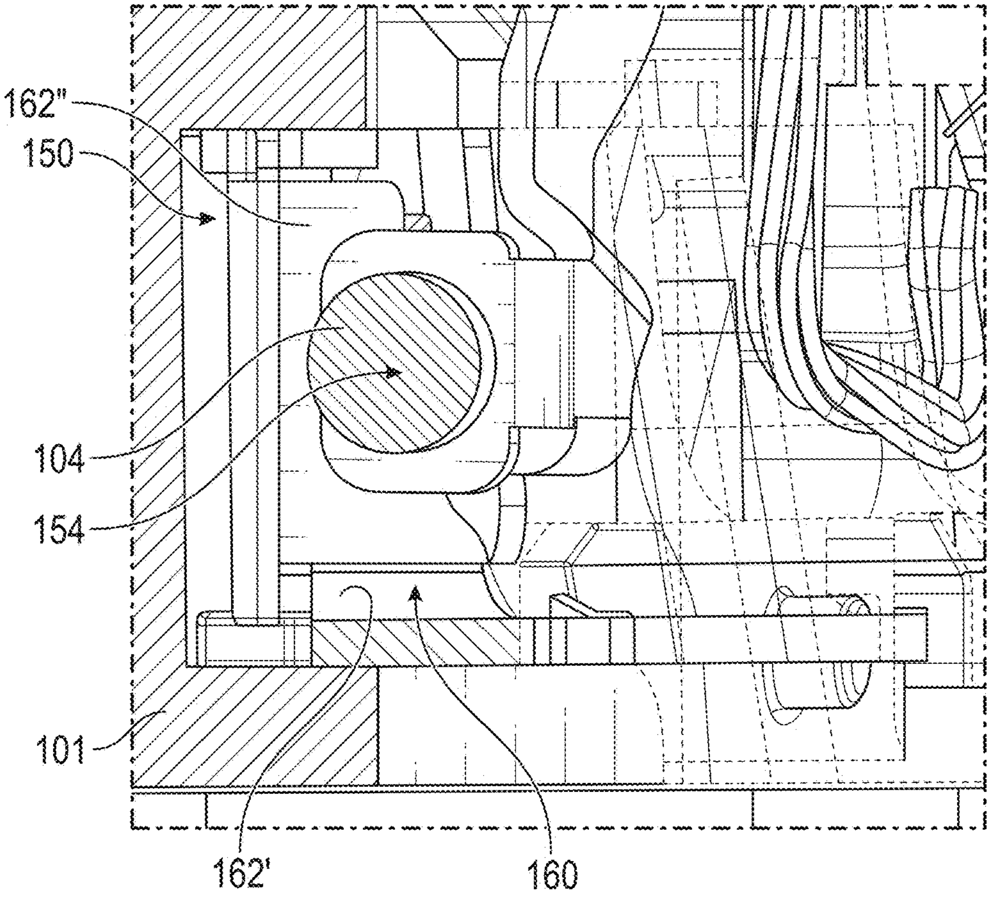
FIG. 7 is a perspective view of an arc chamber that includes a first embodiment of an arc chute and can be included in the circuit breaker shown in FIG. 1, in accordance with an example embodiment of the disclosed concept.
Figure 8:
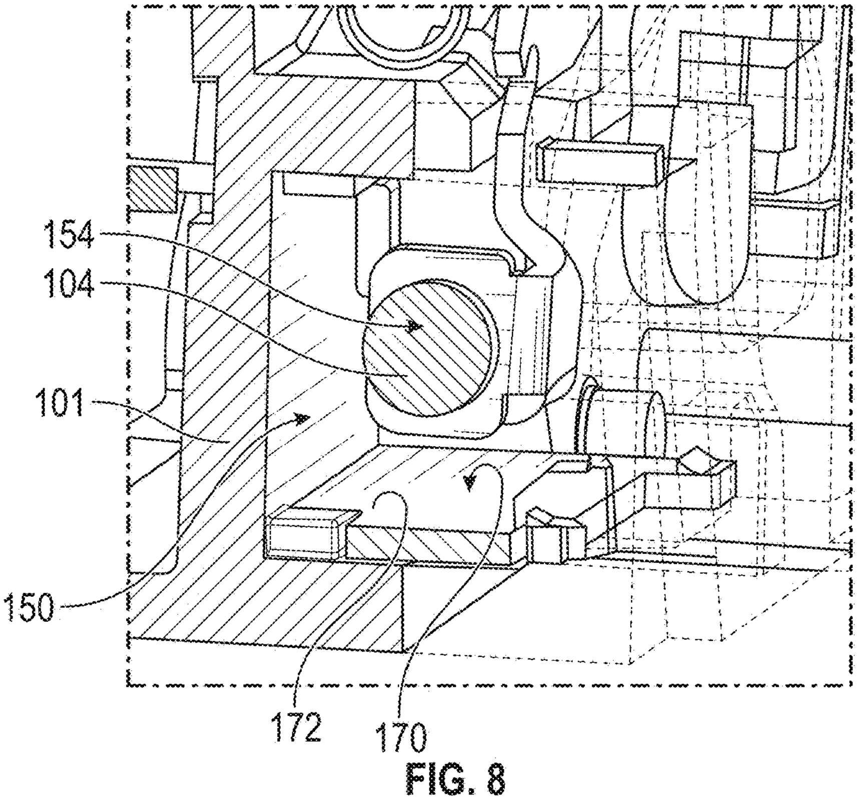
FIG. 8 is a perspective view of an arc chamber that includes a second embodiment of an arc chute and can be included in the circuit breaker shown in FIG. 1, in accordance with an example embodiment of the disclosed concept.

In addition to the inclusion and use of the secondary contacts 106, the primary external vent 120, the internal primary vent 131, and the secondary external vent 135 in the circuit breaker 100, the features of an arc chamber 150 included in the circuit breaker 100 can further mitigate the effects of arcing. FIG. 7 and FIG. 8 each show a different embodiment of an arc chute that can be included in an arc chamber 150 of the circuit breaker 100, the arc chutes being used to dissipate the arc generated when the primary contacts 102 separate. The arc chamber 150 is a portion of the housing 101 that forms a partial enclosure around the primary movable contact 104. Prior to detailing the arc chute embodiments, it is noted that there is a particular surface of the primary movable contact 104 that engages with the primary stationary contact 103 when the primary contacts 102 are closed, this particular surface being referred to hereinafter as an engagement surface 154 that is numbered in FIG. 7 and in FIG. 8.

Referring now to FIG. 7, an arc chamber 150 that includes a first embodiment 160 of an arc chute is shown, in accordance with an example embodiment of the disclosed concept. The arc chute 160 has a half-wrap design and is referred to hereinafter as the half-wrap arc chute 160. The half-wrap arc chute 160 comprises a plurality of chute surfaces 162 such that the chute surfaces 162 collectively are coincidental with a plurality of planes, the chute surfaces 162 being numbered 162' and 162" in FIG. 7 in order to be differentiable from one another. The chute surfaces 162 face the interior of the arc chamber 150 but do not face the engagement surface 154 of the primary movable contact 104. The chute surfaces 162 also do not face one another, as can be discerned when viewing chute surface 162' and chute surface 162".

Referring now to FIG. 8, an arc chamber 150 that includes a second embodiment 170 of an arc chute is shown, in accordance with another example embodiment of the disclosed concept. The arc chute 170 has a single plate design and is referred to hereinafter as the single plate arc chute 170. The single plate arc chute 170 comprises a single chute plate 172. The chute plate 172 is disposed such that a plane co-planar with the movable contact engagement surface 154 is perpendicular to the chute plate 172.

The data in table 200 was collected for an embodiment of the circuit breaker 100 that uses the half-wrap arc chute 160 in the chamber 150. It is noted that using the single plate arc chute 170 in the arc chamber 150 shows similar reductions in pressure and let-through energy as the half-wrap arc chute 160. The only notable difference between the half-wrap arc chute 160 and the single plate arc chute 170 is the increased ability of the half-wrap arc chute 160 to protect other components within the circuit breaker 100 during arcing generated by the primary contacts 102. For example, in some instances, the arc generated by the separation of the primary contacts 102 has been observed commutating to a mechanical spring 126 (numbered in FIG. 1A) of the circuit breaker 100, leading to annealing of the mechanical spring 126, and so it is desirable to implement the half-wrap arc chute 160 when the particular configuration of the circuit breaker 100 is expected to lead to an arc generated by the primary contacts 102 being commutated to other nearby components.

In sum, it can be appreciated from the foregoing detailed description that including the internal primary vent 131 and the secondary exhaust vent 135 in the disclosed improved circuit breaker 100, in combination with including the secondary contacts 106 and positioning the two sets of separable contacts 102 and 106 in series, causes greater reduction of pressure within the disclosed circuit breaker 100 compared to known circuit breakers, and can aid in achieving a higher short circuit rating for a circuit breaker such as a miniature circuit breaker (i.e. 22 kA for the disclosed circuit breaker 100 versus only 10 kA for known circuit breakers).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A circuit breaker, the circuit breaker comprising:

a housing;

a line side structured to electrically connect to a power source;

a load side structured to electrically connect to a load;

a first set of separable contacts, the first set of separable contacts being primary contacts electrically connected between the line side and the load side;

a second set of separable contacts, the second set of separable contacts being secondary contacts electrically connected between the line side and the load side;

a thermal magnetic arrangement configured to open the primary contacts from a closed state once current reaches a predetermined severity threshold;

a secondary actuator structured to open the secondary contacts from a closed state;

a printed circuit board, PCB, the PCB being structured to monitor electrical conditions in the circuit breaker and actuate the secondary actuator;

an internal primary vent structured to vent gas away from a vicinity of the primary contacts and into an area internal to the housing; and a secondary exhaust vent structured to vent gas away from the secondary contacts to an exterior of the housing, wherein the primary contacts and the secondary contacts are in series, wherein the PCB is configured such that, when the primary contacts are closed and the secondary contacts are closed, the PCB actuates the secondary actuator to open the secondary contacts simultaneously during thermal-magnetic opening of the primary contacts in response to detecting a fault condition exceeding a predetermined severity threshold.

2. The circuit breaker of claim 1, further comprising:

a primary exhaust vent structured to vent gas away from the primary contacts to an exterior of the housing.

3. The circuit breaker of claim 2, wherein the circuit breaker is structured such that opening the secondary contacts simultaneously with the primary contacts during the fault condition yields a reduction in peak current, Ipk, compared to only opening the primary contacts during the fault condition without opening the secondary contacts.

4. The circuit breaker of claim 3, wherein the circuit breaker is structured such that venting gas through the secondary exhaust vent and the primary exhaust vent yields a reduced peak pressure compared to venting gas only through the primary exhaust vent without venting gas through the secondary exhaust vent.

5. The circuit breaker of claim 3, wherein the circuit breaker is structured such that venting gas through the internal primary vent, the secondary exhaust vent, and the primary exhaust vent yields a reduced peak pressure compared to venting gas only through the primary exhaust vent.

6. The circuit breaker of claim 3, wherein the circuit breaker is structured such that venting gas through the internal primary vent, the secondary exhaust vent, and the primary exhaust vent yields a first peak pressure, wherein the circuit breaker is structured such that venting gas only through the secondary exhaust vent and the primary exhaust vent without venting gas through the internal primary vent yields a second peak pressure, and wherein the circuit breaker is structured such that the first peak pressure is less than the second peak pressure.

7. The circuit breaker of claim 3, when the circuit breaker has a 10 kA fault current rating, and wherein the circuit breaker is structured such that:

when only the primary contacts are opened during the fault condition, a peak let-through current Ipk is at least 7 kiloamps, and when the secondary contacts are opened simultaneously with the primary contacts during the fault condition, a peak let-through current Ipk is less than 6 kiloamps.

8. The circuit breaker of claim 3, when the circuit breaker has a 10 kA fault current rating, and wherein the circuit breaker is structured such that:

when only the primary contacts are opened during the fault condition and gas is vented through only the primary exhaust vent, a first peak pressure is generated in an interior location within the housing, when the secondary contacts are opened simultaneously with the primary contacts during the fault condition and gas is vented through both the primary exhaust vent and the secondary exhaust vent but not vented through the internal primary vent, a second peak pressure is generated in the interior location within the housing, and the second peak pressure is at least 50% less than the first peak pressure.

9. The circuit breaker of claim 3, when the circuit breaker has a 10 kA fault current rating, and wherein the circuit breaker is structured such that:

when only the primary contacts are opened during the fault condition and gas is vented through only the primary exhaust vent during the fault condition, a first peak pressure is generated in an interior location within the housing, when the secondary contacts are opened simultaneously with the primary contacts during the fault condition and gas is vented through all three of the primary exhaust vent, the secondary exhaust vent, and the internal primary vent during the fault condition, a second peak pressure is generated in the interior location within the housing, and the second peak pressure is at least 60% less than the first peak pressure.

10. The circuit breaker of claim 1, wherein the primary contacts include a primary stationary contact and a primary movable contact, wherein the primary movable contact comprises an engagement surface that engages the primary stationary contact when the primary contacts are closed, wherein a portion of the housing forms an arc chamber, the arc chamber being a partial enclosure formed around the primary movable contact, wherein the arc chamber includes a half-wrap arc chute, wherein the half-wrap arc chute comprises a plurality of chute surfaces such that the chute surfaces collectively are coincidental with a plurality of planes, wherein the chute surfaces face the interior of the arc chamber but do not face the engagement surface, and wherein the chute surfaces do not face one another.

11. The circuit breaker of claim 1, wherein the primary contacts include a primary stationary contact and a primary movable contact, wherein the primary movable contact comprises an engagement surface that engages the primary stationary contact when the primary contacts are closed, wherein a portion of the housing forms an arc chamber, the arc chamber being a partial enclosure around the primary movable contact, wherein the arc chamber includes a single plate arc chute comprising a single chute plate, wherein the chute plate is disposed such that a plane co-planar with the engagement surface is perpendicular to the chute plate.

12. The circuit breaker of claim 1, wherein the housing is produced from thermoplastic.

* * * * *